United States Patent Office 3,586,707
Patented June 22, 1971

3,586,707
ESTERIFICATION OF MONO HALO-DINITRO-ETHANOL AND TRINITROETHANOL IN THE PRESENCE OF PYRIDINE-N-OXIDE
Thomas N. Hall, Adelphi, Md., assignor to the United States of America as represented by the Secretary of the Navy
No Drawing. Continuation-in-part of application Ser. No. 407,929, Oct. 30, 1964. This application Nov. 4, 1968, Ser. No. 773,299
Int. Cl. C07c 67/00, 69/78
U.S. Cl. 260—476        8 Claims

ABSTRACT OF THE DISCLOSURE

A method for the preparation of carboxylic acid esters which consists of reacting negatively substituted carbinols with an acid halide in the presence of pyridine N-oxide.

CROSS REFERENCE TO RELATED APPLICATIONS

This application is a continuation-in-part of Ser. No. 407,929, filed on Oct. 30, 1964, now U.S. Pat. No. 3,431,290.

BACKGROUND OF THE INVENTION

This invention relates to a method for preparing carboxylic esters of complex, negatively-substituted carbinols which are useful as high energy oxidizers. In particular, the method of this invention is directed to the preparation of carboxylic esters of complex aliphatic and/or aromatic mono- and poly-carbinols in which the beta carbon atom contains negative groups such as halogen and/or nitro groups.

SUMMARY OF THE INVENTION

Accordingly, it is an object of this invention to provide a method for the preparation of carboxylic acid esters of carbinols having a negatively substituted beta carbon atom.

Briefly, in accordance with one embodiment of this invention, this and other objects are accomplished by reacting a carbinol containing a negatively substituted beta carbon atom with an acid halide in the presence of pyridine N-oxide.

DESCRIPTION OF THE PREFERRED EMBODIMENTS

The carbinols contemplated as the starting material for the preparation of the esters may be designated by the general formulae, (1)        $ZCX_2CH_2OH$ and (2)        $HOCH_2ACH_2OH$ where Z is H, halo, nitro, lower alkyl and aryl; X is a negative group such as a nitro or halogen group or combination thereof; A is —CXZ— or —CXZ(B)$_n$CXZ—; B is methylene or ethylene oxide; and $n$ is 1 to 5.

By way of illustration, carbinols embraced by general Formula 1 include 2,2-dichloroethanol, 2,2-dinitropropanol, 2,2-dinitrobutanol, phenyl-2,2-dinitroethanol, xylyl-2,2-dinitroethanol, 2,2,2-trinitroethanol, 2 - fluoro-2,2-dinitroethanol, 2-chloro-2,2-dinitroethanol and 2,2,2-trifluoroethanol. Carbinols embraced within the Formula 2 include 2,2,8,8-tetranitro-1,9-nonanediol, 2,2,8,8 - tetranitro-4,6-dioxal - 1,9 - nonanediol, 2,2-dinitro - 1,3 - propanediol, 2,2,4,4 - tetranitro - 1,5 - pentanediol, 2 - methyl-2 - nitro - 1,3 - propanediol, and 2,2,6,6 - tetranitro - 1,7-heptanediol and the like.

The acid halides used in this invention are of the structure $R(COCl)_m$ where R is lower alkyl, lower alkenyl or phenyl when $m=1$ or $(CH_2)_p$ when $m=2$; and p is 1 or 2. These compounds thus include acyl halides such as acetyl chloride, isobutyryl chloride, acrylyl chloride, malonyl chloride, succinyl chloride, benzoyl chloride and the like. Phosgene is excluded from this group as it is already covered by Ser. No. 407,929, filed on Oct. 30, 1964, now U.S. Pat. No. 3,431,290 and because it yields a bis-carbonate and a carboxylic acid ester.

By controlling the rate of addition of the chosen acid halide, the rate of reaction and the rate of heat evolution may be regulated. In order to insure complete esterification, normally an amount of acid halide in excess of stoichiometric requirements is used. In order to simplify work-up, stoichiometric quantities of acyl and aroyl halides are used.

The reaction between the carbinol and the acid halide, according to this invention, is preferably carried out in a chloroparaffin diluent such as trifluorotrichloroethane, methylene chloride, chloroform or mixtures thereof. The diluent should be one which has a relatively low boiling point in order to facilitate work-up of the product and should be non-reactive with the acid halide to avoid competing reactions. For example, the use of esters such as ethyl acetate would be unsuitable because of the probability of the occurrence of trans esterification.

Preferably the diluent, the acid halide and the carbinol should be free of water since the carbinols used as starting materials may partially dissociate in water thereby reducing the total amount of carbinol available for esterification. Thus, it is necessary merely that the reactants be dry in order to overcome this tendency to dissociate and the reaction does not have to be run under the protection of an inert atmosphere.

The temperature of the esterification is not critical and thus the reaction will perform satisfactorily at temperatures above and below 0° C. Since the reaction is exothermic, one should run it at temperatures conducive to a controlled rate of reaction. Similarly, the only limitation as to the minimum operable temperature is the effect of the temperature on the solubility characteristics of the reactants.

Accordingly, good results in terms of simplicity of equipment setup are obtained by using a temperature range of from about 0°–35° C. Higher yields of the ester product may be produced if the temperature range of about 10°–15° C. is used.

A catalyst is needed as explained in the copending application Ser. No. 407,929, now U.S. Pat. No. 3,431,290. The catalyst employed in this invention is pyridine N-oxide which is present in amounts necessary to react with the hydrogen halide which would be formed by complete esterification of the carbinol. Generally about 1 to 10 moles of catalyst may be added per equivalent of esterifiable hydroxyl present in the reaction mixture. As with the acid halide and diluent, the catalyst should preferably be free of water in order to obtain best results in terms of yield.

The esterification reaction is considered to be complete upon cessation of exotherm and the product may then be recovered either by precipitation or fractional distillation, depending on whether it is a solid or a liquid.

The invention will be understood more clearly by reference to the following specific embodiments which are included herein for illustrative purposes only and are not intended to be regarded as an indication of the scope of the invention.

EXAMPLE I 2,2,2-trinitroethyl isobutyrate

An amount of 9.5 g. of pyridine N-oxide which has been dissolved in 100 cc. of chloroform is added to 18.1 g. of 2,2,2-trinitroethanol in another 100 cc. of chloroform. 10.6 g. of isobutyryl chloride in 25 cc. of chloroform is then added to this mixture using an ice bath for cooling with stirring for approximately 2 hours. The resultant mixture is extracted first with sodium bicarbonate and then with water after which it is dried with MgSO$_4$ which is later filtered off. Next, the product is fractionally distilled under vacuum, thus eliminating the chloroform solvent. The product is a liquid and was obtained in 17% yield. Two elemental analyses yielded (percent): C, 28.87, 28.53; H, 3.96, 4.06; N, 16.80, 16.52 in comparison to the calculated values of C, 28.69; H, 3.61; N, 16.73.

EXAMPLE II

2,2,2-trinitroethyl benzoate

This preparation follows a similar procedure to that set forth in Example I except that the acid chloride is benzoyl chloride which is present in 14.06 g. Since the product is a white solid which melts at 76.3–76.7° C., the resultant mixture does not have to be fractionally distilled and the chloroform is merely evaporated off. The product after recrystallization from a benzene-hexane mixture represented 37% yield. Two elemental analyses showed (percent): C, 38.18, 38.08; H, 2.85, 2.76; N, 14.78, 14.50 in comparison to the calculated values of C, 37.90; H, 2.48; N, 14.73.

EXAMPLE III

2-fluoro-2,2-dinitroethyl acrylate

An amount of 19 g. of pyridine N - oxide in 100 ml. of methylene chloride is added to 30.8 g. of 2-fluoro-2,2-dinitroethanol. This mixture is then reacted with 18 g. of acrylyl chloride at room temperature. After standing at room temperature for approximatey 64 hours, the reaction mixture is extracted first with aqueous sodium hydroxide and then with water. This liquid product is next dried and fractionally distilled in a similar manner to the method disclosed in Example I. An elemental analysis yielded (percent): C, 29.02; H, 2.54; N, 13.35; F, 9.15 in comparison to the calculated values of C, 28.85; H, 2.42; N, 13.46; F, 9.13. This method of preparation produced 12.2 g. of the acrylate which is 29.3% yield.

Another variation of this invention occurs with dihydric alcohols if the addition of the reactants is reversed. Thus, if the carbinol is added to the acid chloride the resultant mixture contains more cyclic carbonate than linear polymer which is the opposite situation then if the acid chloride was added to the carbinol. Therefore the percentage of desired product can be controlled by keeping one of the reactants in excess of the stoichiometric amount.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A process for preparing the carboxylic acid ester of a carbinol having the structural formula ZCX$_2$CH$_2$OH wherein Z is selected from the group consisting of nitro and halo and X is nitro which comprises the step of reacting said carbinol with an acid halide of the structure

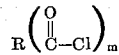

where R is selected from the group consisting of lower alkyl, lower alkenyl, and phenyl when $m=1$, or is $(CH_2)_p$ when $m=2$ wherein $p$ is 1 or 2, in the presence of pyridine N-oxide as a catalyst.

2. The process of claim 1 wherein the reaction is carried out in a chloroparaffin diluent.

3. The process of claim 1 wherein said pyridine N-oxide is present in an amount from about 1–10 moles per equivalent of esterifiable hydroxyl present in the reaction mixture.

4. The process of claim 1 wherein said acid halide is isobutyryl chloride.

5. The process of claim 1 wherein said acid halide is acrylyl chloride.

6. The process of claim 1 wherein said acid halide is benzoyl chloride.

7. The process of claim 1 wherein said carbinol is 2,2,2-trinitroethanol.

8. The process of claim 1 wherein said carbinol is 2-fluoro-2,2-dinitroethanol.

References Cited

UNITED STATES PATENTS 3,396,187   8/1968   Benzinger _____ 260—463
3,360,545   12/1967  Wygant _____ 260—485

OTHER REFERENCES

Culvenor. Review of Pure and Applied Chemistry, vol. 3 (1953), pp. 105–6.

Cram et al., Organic Chemistry, 2nd ed. (McGraw-Hill), 1964, pp. 358–9.

CHARLES B. PARKER, Primary Examiner

E. J. GLEIMAN, Assistant Examiner

U.S. Cl. X.R.

260—475, 485, 486, 488